United States Patent
Wernze et al.

(10) Patent No.: US 7,725,371 B2
(45) Date of Patent: May 25, 2010

(54) INVOICING METHODS AND SYSTEMS FOR PROCESSING CONVERGENT CONTRACT ACCOUNTS

(75) Inventors: Frank Wernze, Muenster (DE); Martin Hellmann, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/729,915

(22) Filed: Mar. 30, 2007

(65) Prior Publication Data
US 2008/0243654 A1 Oct. 2, 2008

(51) Int. Cl.
*A01K 5/02* (2006.01)
*G06F 17/50* (2006.01)
*G07F 19/00* (2006.01)
*H04M 15/00* (2006.01)

(52) U.S. Cl. .......................................... 705/29; 705/34
(58) Field of Classification Search .................... 705/29, 705/34
See application file for complete search history.

(56) References Cited

U.S. PATENT DOCUMENTS

| | | | | |
|---|---|---|---|---|
| 5,956,690 | A * | 9/1999 | Haggerson et al. | 705/3 |
| 6,381,587 | B1 * | 4/2002 | Guzelsu | 705/40 |
| 7,184,977 | B1 * | 2/2007 | Crim et al. | 705/34 |
| 2002/0010666 | A1 * | 1/2002 | Wright | 705/34 |
| 2004/0014479 | A1 * | 1/2004 | Milman | 455/457 |
| 2004/0133487 | A1 * | 7/2004 | Hanagan et al. | 705/34 |
| 2004/0153404 | A1 * | 8/2004 | Rischmueller et al. | 705/40 |
| 2004/0254866 | A1 * | 12/2004 | Crumbach et al. | 705/34 |
| 2006/0287954 | A1 * | 12/2006 | DeWitt et al. | 705/40 |
| 2007/0050230 | A1 * | 3/2007 | Umagat | 705/9 |
| 2007/0078765 | A1 * | 4/2007 | Holton | 705/40 |
| 2007/0214068 | A1 * | 9/2007 | Tadepalli et al. | 705/34 |
| 2007/0265962 | A1 * | 11/2007 | Bowe et al. | 705/40 |

OTHER PUBLICATIONS

Intec to acquire US inter, M2 Presswire, Coventry, Jan. 18, 2001, p. 1.*
Proactive collection management, Industrial Distribution, New York, Dec. 2003, vol. 92 Issue 12, p. 35.*
Multiband and Directv customers, Business wire, New York, Nov. 9, 2006.*

* cited by examiner

*Primary Examiner*—Matthew S Gart
*Assistant Examiner*—Harshad Parikh
(74) *Attorney, Agent, or Firm*—Finnegan, Henderson, Farabow, Garrett & Dunner, LLP

(57) ABSTRACT

Systems and methods consistent with the invention relate to the processing of invoices. According to one exemplary embodiment, a method for processing invoices associated with service contracts may comprise receiving data associated with a first service contract. The method may then analyze the first service contract data based on a processing rule. The method may then determine, based on the analyzed first contract data, whether the received first service contract data relates to an existing service contract. The method may then process an invoice associated with the first service contract based on the determination of whether the received first service contract data relates to an existing service contract.

14 Claims, 5 Drawing Sheets

INVOICING METHODS AND SYSTEMS FOR PROCESSING CONVERGENT CONTRACT ACCOUNTS

FIELD

The present invention relates to methods and systems for processing invoices to customers. More particularly, the invention relates to methods and systems for processing invoices for convergent contract accounts.

BACKGROUND

Invoicing is an important if not indispensable part of today's business transactions. Generally speaking, an invoice is a commercial document issued by one business partner to another, evidencing a transaction in which terms such as the products or services, their quantities, and agreed prices are indicated. The issuance of the invoice from one business partner to another signifies that payment is due from the partner receiving the invoice (such as a customer) to the partner posting the invoice (such as a service provider) according to the agreed terms of the invoice. The invoice may also include references to prior documents, such as purchase orders, goods receipt, and other documents that have been produced in connection with the business transaction.

Businesses may use a customer relationship management (CRM) system to manage invoices for the business's customers. For instance, the CRM system may manage invoices for when a customer enters into a long-term contract for a particular service. If, however, the customer subsequently contracts for another service with the business, the CRM system may then generate a new business agreement with the customer, leading to a new invoice for that customer. The customer would thus receive multiple invoices from the same business partner.

Receiving multiple invoices from the same business partner can be burdensome for the customer. This problem is, of course, exacerbated as the customer contracts for more and more services, and thus receives more and more invoices. Current CRM systems, however, are not capable of generating a single invoice for a customer as they will generate a new contract account for each new service, causing the generation of the new invoice. Other customers may, however, want a separate invoice for each contracted service. Thus, a one-size fits all approach does not typically work for invoice processing.

Accordingly, there exists a need for an invoicing system that may efficiently process invoices in situations where, for example, a customer may contract for multiple services from a particular business.

SUMMARY OF THE INVENTION

Systems and methods consistent with the invention relate to the processing of invoices. According to one exemplary embodiment, a method for processing invoices associated with service contracts may comprise receiving data associated with a first service contract. The method may then analyze the first service contract data based on a processing rule. The method may then determine, based on the analyzed first contract data, whether the received first service contract data relates to an existing service contract. The method may then process an invoice associated with the first service contract based on the determination of whether the received first service contract data relates to an existing service contract.

According to an additional exemplary embodiment, a method for managing invoices for a customer may comprise receiving data associated with a first service contract by the customer. The method may then provide a user exit by which the customer may request a separate invoice for the first service contract. The method may apply, when the customer has not selected the separate invoice, a convergent processing rule to determine whether the received first service contract data relates to an existing service contract. The method may further include generating an invoice reflecting the first service contract and the existing service contract based on a determination that the first service contract data relates to the existing service contract.

Other objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Figure 1:
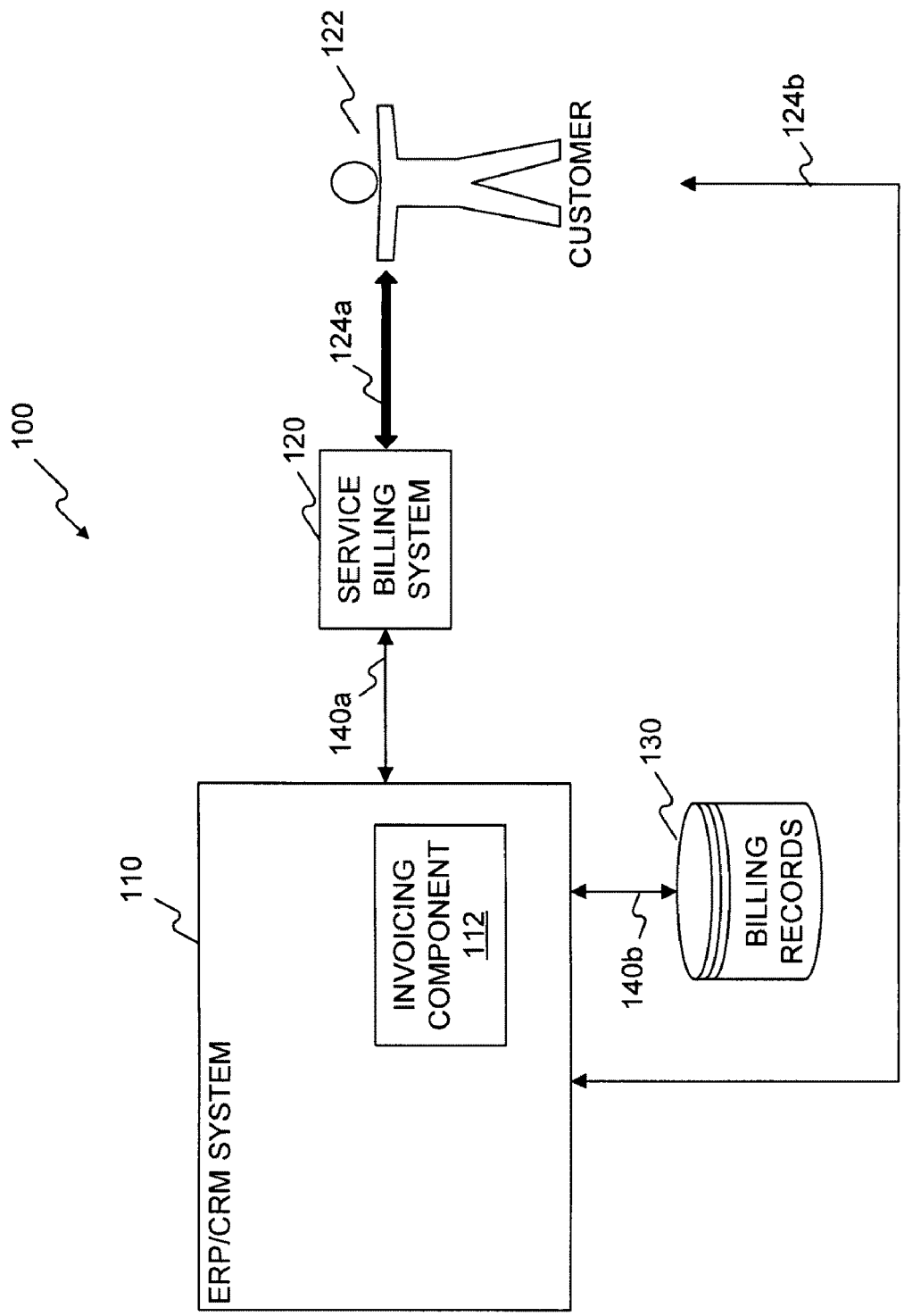
FIG. 1 illustrates an exemplary system environment for implementing embodiments consistent with the present invention.

The following description refers to the accompanying drawings. Wherever possible, the same reference numbers will be used throughout the drawings to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

As used herein, the term "customer" broadly refers to any person, business, or organization, agency, or other entity that is to receive an invoice, such as a bill, for services, including goods. Further, the term "service contract" and "contracted services" broadly refers to any type of contractual relationship, as described below, associated with a billable or otherwise chargeable item in a billing environment. This includes, but is not limited to, billable services or goods requested by or provided to a customer. The terminology "convergent" service contracts or service accounts broadly refers to service contracts or accounts related to one another, such as by being related to a common customer and/or financial account for paying invoices.

As described in detail below, embodiments of the invention may be used in billing environments, including complex billing environments where customers may enter into multiple service contracts. For instance, in a billing environment, a service contract may exist between a customer and biller, such as where the biller is a service provider or merchant. Consistent with embodiments of the invention, these service contracts may exist due to written, oral, or implied contracts, agreements, or other arrangements that require the payment of a monetary amount or other consideration in exchange for the delivery or performance of specified goods or services. The invoices for such goods or services may be issued before or after providing the requested services or goods. Embodiments of the present invention, however, are not limited to relationships based on contracts for services or goods, and may be applied to other types of relationships.

Consistent with embodiments of the invention, systems, methods, and articles of manufacture are provided for identifying convergent service contracts and processing invoices for such convergent service contracts. Service contracts may be referred to as convergent when they relate to a common customer. For example, a customer may contract with a provider for a fixed telephone line account and then separately contract with the provider for a mobile telephone account. The two contracts may be referred to as convergent service contracts since they relate to a common customer.

FIG. 1 is a block diagram of an exemplary system environment 100 for processing invoices consistent with the invention. As shown in FIG. 1, system 100 may include an enterprise resource planning (ERP) system and/or a customer relationship management (CRM) system 110, a service billing system 120, and a billing records database 130. Each of the components of system 100 may be connected or communicate with one another via communication links 140. Further, the components depicted in FIG. 1 may be distributed among multiple locations or located at a single location.

ERP/CRM system 110 may manage customer accounts for an enterprise. For example, ERP/CRM system 110 may track outstanding balances, generate notices to customers based on overdue payments, generate invoices to customers for payments due or provide invoicing data to service billing system 120 so that service billing system 120 may generate the actual invoices for sending to customers. These tasks are simply exemplary, however, as ERP/CRM system 110 may perform other tasks associated with a customer's account. To perform these tasks, ERP/CRM system 110 may include rules or logic used to implement a task based on, for example, billing data received from service billing system 120 for a particular customer. Further, while FIG. 1 shows ERP/CRM system 110 receiving billing data from only one service billing system 120, systems 100 consistent with the invention may include an ERP/CRM system 110 that receives billing data from multiple service billing systems 120, each of which may be generating billing data for multiple customers.

In exemplary embodiments, ERP/CRM system 110 may thus be a type of software application system that provides one or more services, such as generating customer records and managing customer accounts based on billing data included within the customer records. The services may be accessible to other parts of system 100 through a communication mechanism, such as communication links 140. ERP/CRM system 110 may be constructed, for example, using ERP and/or CRM tools that are commercially available from SAP AG (Walldorf, Germany). ERP/CRM system 110 may, however, be implemented using any type of software application system, and need not, for example, include actual ERP or CRM tools.

Service billing system 120 may be operated by a service provider providing multiple types of service contracts that customers may enter into. Service billing system 120 may thus supply ERP/CRM system 110 with service contract data associated with services or goods contracted for by a customer. For example, service billing system 120 may be associated with a telephone service provider that offers services, such as fixed line and mobile line telephone communication services for which customers may contract. Service billing system 120 may then also generate billing data for customers that have entered into a particular service contract. The service contract data and billing data generated by service billing system 120 may include any type of data included on an invoice. Such data may, for example, include an ID associated with the respective customer, as well as payment data identifying a financial account used to pay for services or goods consumed by the respective customer.

Service billing system 120 may thus provide billing data that may reflect an actual service or good to be billed to the customer. Service billing system 120 may be an application specific software application. Service system 120 may also be configured to communicate with customers, such as customer 122, who have entered into a service contract. To this end, service system may include a computer-implemented user interface though which customer 122 may access billing data and make selections with regard to desired invoice processing (e.g., as depicted by arrow 124a). Further, while FIG. 1 shows service billing system 120 as located external to ERP/CRM system 110, exemplary embodiments also include arrangements where service billing system 120 is a part of, or implemented by, ERP/CRM system 110.

ERP/CRM system 110 may then generate an invoice to customer 122, as depicted by arrow 124b. When customer 122 pays the invoice, the customer's payment may be received and accounted for by ERP/CRM system 110, as also depicted by arrow 124b. In this regard, as shown in FIG. 1, ERP/CRM system 110 may further include an invoicing component 112. Invoicing component 112 may send invoices to customer 122, as depicted by arrow 124b, based on billing data received from service billing system 120. In this regard, invoicing component 112 may include convergent account rules, which, as described in greater detail below, may be used to identify convergent accounts and process invoices for such convergent accounts. In exemplary implementations, invoicing component 112 may be implemented by using an ERP Invoicing system that is commercially available from SAP AG (Walldorf, Germany).

While exemplary embodiments described herein included invoicing component 112 that may generate invoices, alternative embodiments may include a service billing system 120 that generates the invoices. In such arrangements, invoicing component 112 may generate invoicing data and supply that invoicing data to service billing system 120. Service billing system 120 may then print or provide the actual invoices to the respective customers associated with service billing system 120.

Billing record database 130 may store invoicing records generated by invoicing component 112. In one embodiment, database 130 may store invoice data in an XML format, which may have a predefined schema. Systems consistent with the invention may use other formats, however. For example, database 130 may store invoice data in a table form using relational databases or may store invoice data as a business object. Database 130 may also store the convergent account rules that may be used by invoicing component 112 to identify convergent accounts and process invoices for such convergent accounts.

Network connections 140a, 140b may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 164a, 140b. Moreover, network connections 140a, 140b may be embodied using bi-directional, unidirectional, or dedicated communication links. Network connections 140a, 140b may also implement standard transmission protocols, such as Transmission Control Protocol/Internet Protocol (TCP/IP), Hyper Text Transfer Protocol (HTTP), SOAP, RPC, or other protocols.

Figure 2:
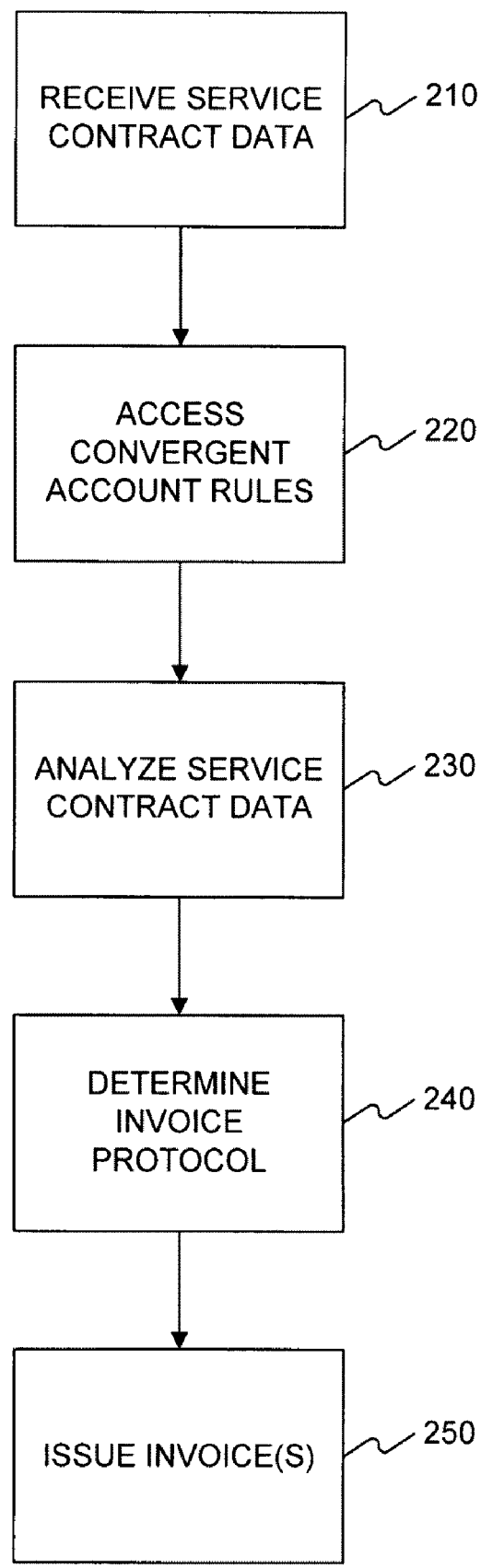
FIG. 2 illustrates an exemplary flow diagram of an invoicing process consistent with the present invention.

FIG. 2 is a flowchart of an exemplary process, consistent with the present invention, for processing invoices associated with divergent contract accounts. For purposes of illustration only, the process of FIG. 2 will be described with respect to the exemplary system environment 100 of FIG. 1. As shown in FIG. 2, invoicing component 112 may receive service contract data (stage 210). Invoicing component 112 may receive the service contract data from, for example, service billing system 120. The service contract data, as explained above, generally relates to a service or good for which a customer has contracted for with a provider. The service contract data may thus identify information about the particular customer, the type of contracted service, or the form of payment for the contracted service. Information about the customer may include the customer's name, address, account number, or other data about the customer. Information about the contracted service may include a description of the service or good, a product number, or other identification or description of the contracted service. The payment data may reflect financial account information associated with the customer or service contract. For example, the payment data may include an identification of a financial account provided by the customer to be used for paying invoices associated with the contracted service.

Upon receiving the service contract data, system 100 may then access convergent account rules (stage 220). System 100 may, in one exemplary embodiment, store the convergent account rules in billing database 130. In systems and methods consistent with the invention, the convergent account rules may define when multiple service contracts are deemed convergent. For example, a convergent account rule may identify particular data types included in the service contract data that may indicate when two or more service contracts are convergent. In one implementation, a convergent account rule may determine that when the identified data types take the same value (e.g., the customer has provided the same information for the identified data type in two or more service contracts), the service contracts are convergent.

System 100 may then analyze the received service contract data by using the convergent account rules (stage 230). For instance, invoicing component 112 may compare the data of the received service contract data with respect to the like data associated with any existing service contracts. If the compared data meets criteria of one or more convergent account rules, then invoicing component 112 may determine that the two service contracts are convergent. Based on this analysis, invoicing component 112 may then determine an invoice protocol to apply to the received service contract data (stage 240) and then issue one or more appropriate invoices based on the determined protocol (stage 250).

Figure 3:
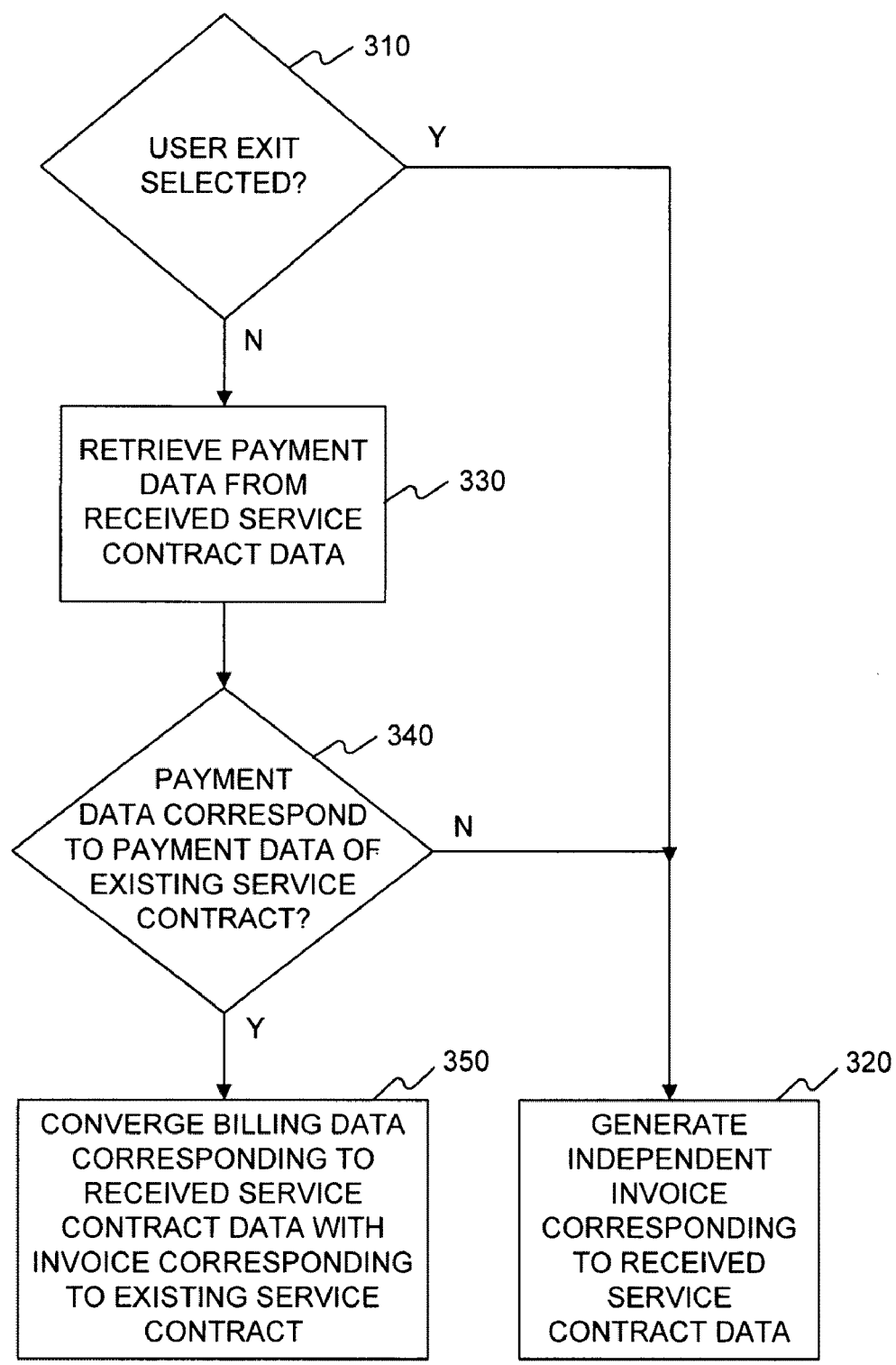
FIG. 3 illustrates an exemplary flow diagram of a convergent account determination and invoicing process consistent with the present invention.

The processing of stages 230 to 250 is described in greater detail below with respect to FIG. 3. In particular, FIG. 3 illustrates an invoicing process for convergent accounts consistent with the present invention. This invoicing process may be performed by, for example, invoicing component 112 of ERP/CRM system 110. As shown in FIG. 3, the exemplary process may begin by first determining whether a user exit has been selected (stage 310). In systems consistent with the invention, a user exit may be used by a customer to opt out of a convergent account invoicing process. As described in greater detail below, a convergent account invoicing process may identify convergent service contracts and generate a consolidated invoice for those convergent contracts. Thus, the customer would not receive a separate invoice for each service contract. Because not all customers may desire a consolidated invoice and may prefer independent or separate invoices for each service contract, the user exit allows the customer to opt out of the convergent account invoicing process. If the customer thus selects the user exit (stage 310; Yes), then invoicing component 310 may generate an independent invoice for billed data from service billing system 120 associated with the received service contract data (stage 320).

If, however, the customer has not selected the user exit (stage 310; No), then processing may proceed to stage 330. Here, the exemplary embodiment of FIG. 3 relates to the processing of a convergent account rule that may define convergent accounts on the basis of payment data. The payment data may be included within the service contract data, as described above with respect to processing stage 210. As shown in FIG. 3, invoicing component 112 may access or retrieve any payment data included within the received service contract data (stage 330). While invoicing component 112 may also access other data as part of processing invoices of convergent accounts, in this exemplary embodiment, the particular convergent account rule may instruct invoicing component to compare the payment data associated with one or more service contracts.

Accordingly, invoicing component 112 may then determine whether the payment data of the received service contract data corresponds to the payment data of an existing service contract (stage 340). Invoicing component 112 may make this determination based on criteria included in the convergent account rule. For example, the convergent account rule may require that the financial account for paying an invoice be the same for two or more service contracts to be deemed convergent. If the criteria of the convergent account rule is met (stage 340; Yes), then invoicing component 112 may converge the billing data of the two or more service contracts (stage 350). For instance, instead of generating a separate invoice for each service contract, invoicing component 112 may combine the invoicing data for each into one invoice for receipt by the customer.

The convergent account rule illustrated in FIG. 3 is exemplary. Other convergent account rules consistent with the invention may include criteria defining that service contracts are convergent based on criteria other than payment data. For instance, convergent account rules consistent with the invention may define that service contracts are convergent based on customer data associated service contracts. If, for example, two or more service contracts identify the same customer, then invoicing component 113 may determine the two or more service contracts as convergent.

Figure 4A:
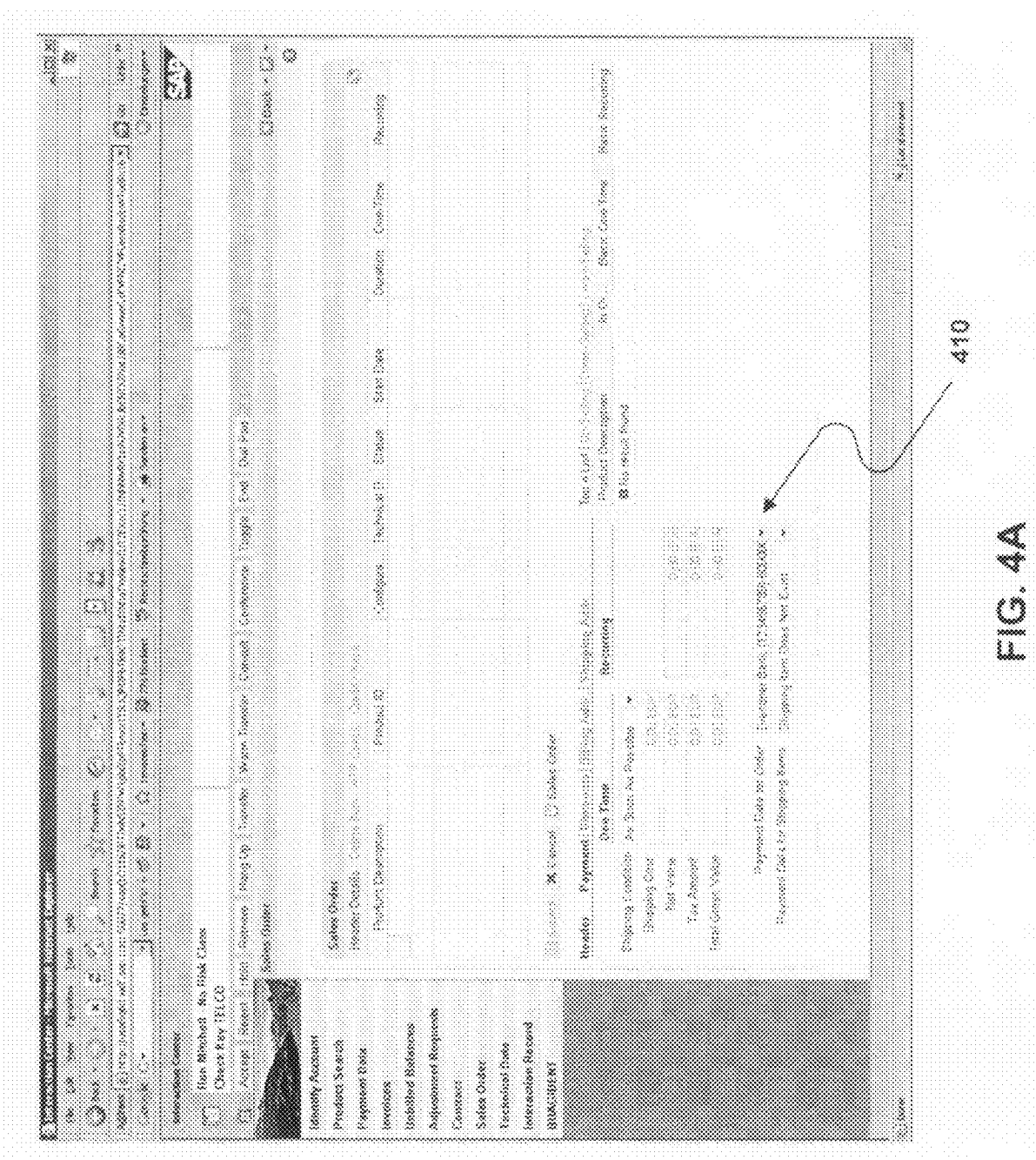
FIGS. 4A and 4B illustrate exemplary user interfaces for implementing embodiments consistent with the present invention.
Figure 4B:
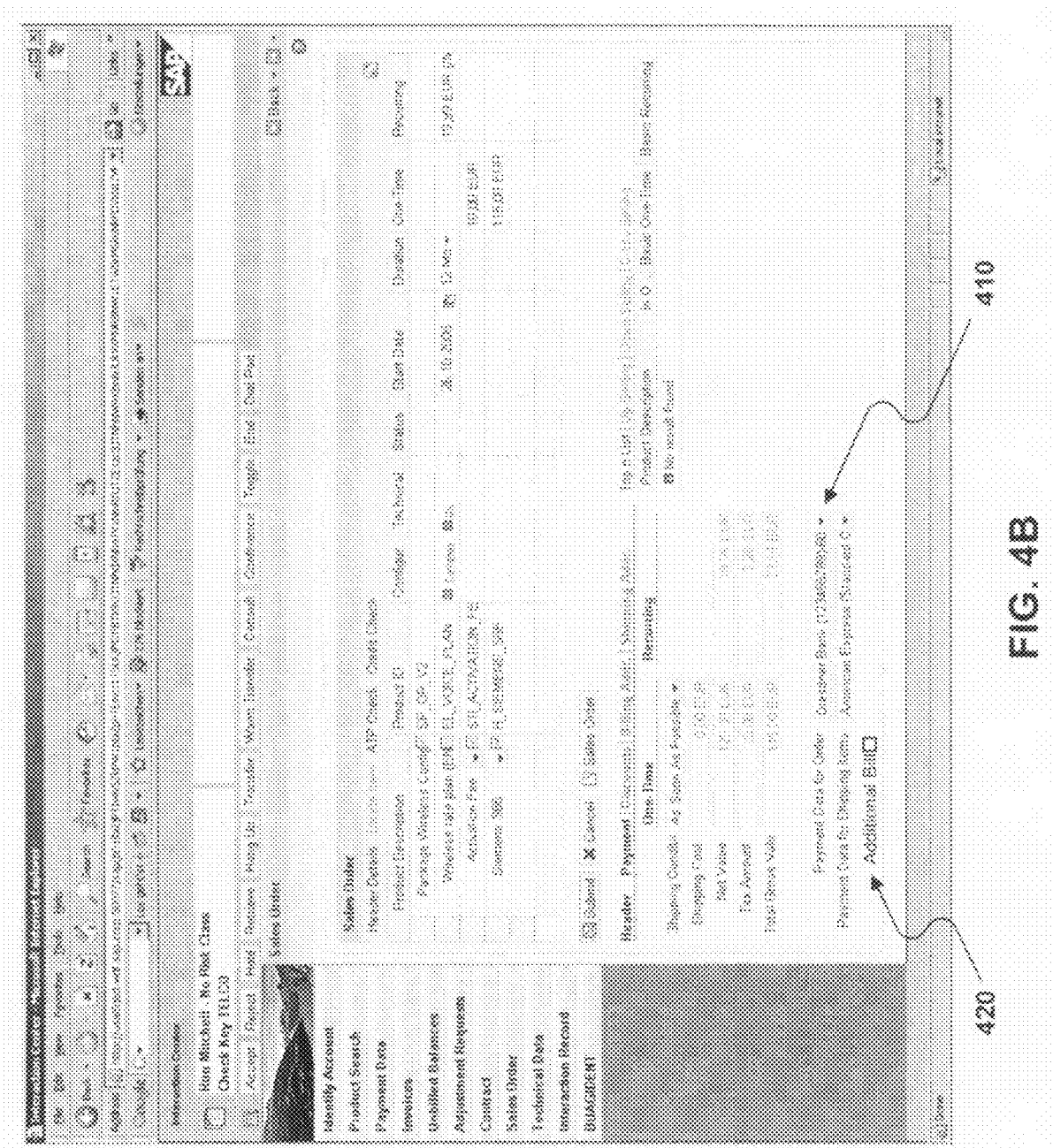

FIGS. 4A and 4B illustrate additional aspects of exemplary embodiments consistent with the invention. FIG. 4A, for example, illustrates a user interface display screen that may be used by a customer or other user of system 100 to display information associated with a service contract. As shown in FIG. 4A, the displayed information may include payment data 410 associated with a service contract. FIG. 4B also illustrates a user interface display screen that may be used by a customer or other user of system 100 to display information associated with a service contract. The service account data included in the exemplary display screen of FIG. 4B may relate to a different service contract that any service contract associated with the display screen of FIG. 4A. As shown in FIG. 4B, however, the display screen may also include a user exit 420. As described above, a user may select user exit 420 to, for example, instruct system 100 not to automatically combine the invoicing data of two or more service contracts into one invoice.

For purposes of explanation only, certain aspects and embodiments are described herein with reference to the components illustrated in FIGS. 1-4. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in or with respect to FIGS. 1-4 are exemplary and not intended to be limiting. Thus, other method steps may be used, and even with the methods depicted in FIGS. 1-4, the particular order of events may vary without departing from the scope of the present invention. Moreover, certain steps may not be present and additional steps may be implemented in FIGS. 1-4. Also, the processes described herein are not inherently related to any particular apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for processing invoices associated with service contracts, comprising:
   providing a computer processor;
   receiving data associated with a first service contract;
   analyzing the first service contract data, using the computer processor, based on a processing rule having criteria defining that multiple service contracts are related based on payment data identifying a form of payment for an invoice;
   determining whether a customer has opted out of a convergent account invoicing process;
   determining, when the customer has not opted out of the convergent account invoicing process, whether the received first service contract data relates to an existing service contract based on the analyzed first contract data; and
   processing an invoice associated with the first service contract based on the determination of whether the received first service contract data relates to an existing service contract.

2. The method of claim 1, wherein processing the invoice further includes:
   generating a single invoice associated with the first service contract data and the existing service contract based on a determination that the received first service contract data relates to the existing service contract.

3. The method of claim 1, wherein the processing rule is a convergent account rule that includes criteria defining when multiple service contracts are related.

4. The method of claim 3, wherein the criteria defines that multiple service contracts are related based on customer data.

5. A computer-readable medium containing instructions to configure a processor to perform a method for processing invoices associated with service contracts, comprising:
   receiving data associated with a first service contract;
   analyzing the first service contract data based on a processing rule having criteria defining that multiple service contracts are related based on payment data identifying a form of payment for an invoice;
   determining whether a customer has opted out of a convergent account invoicing process;
   determining, when the customer has not opted out of the converged account invoicing process, whether the received first service contract data relates to an existing service contract based on the analyzed first contract data; and
   processing an invoice associated with the first service contract based on the determination of whether the received first service contract data relates to an existing service contract.

6. The computer-readable medium of claim 5, wherein processing the invoice further includes:
   generating a single invoice associated with the first service contract data and the existing service contract based on a determination that the received first service contract data relates to the existing service contract.

7. The computer-readable medium of claim 5, wherein the processing rule is a convergent account rule that includes criteria defining when multiple service contracts are related.

8. The computer-readable medium of claim 7, wherein the criteria defines that multiple service contracts are related based on customer data.

9. A system for managing invoices for a customer, the system comprising:
   a memory; and
   a processor coupled to the memory, wherein the processor is configured to:
   receive data associated with a first service contract;
   analyze the first service contract data based on a processing rule having criteria defining that multiple service contracts are related based on payment data identifying a form of payment for an invoice;
   determine whether a customer has opted out of a convergent account invoicing process;
   determine, when the customer has not opted out of the convergent account invoicing process, whether the received first service contract data relates to an existing service contract based on the analyzed first contract data; and
   process an invoice associated with the first service contract based on the determination of whether the received first service contract data relates to an existing service contract.

10. The system of claim 9, wherein the processing rule is a convergent account rule that includes criteria defining when multiple service contracts are related.

11. The system of claim 9, wherein the criteria defines that multiple service contracts are related based on customer data.

12. The system of claim 9, wherein processing the invoice further includes:

generating a single invoice associated with the first service contract data and the existing service contract based on a determination that the received first service contract data relates to the existing service contract.

13. A computer-implemented method for managing invoices for a customer, the method comprising:

providing a computer processor;

receiving data associated with a first service contract by the customer;

providing a user exit by which the customer may request a separate invoice for the first service contract such that the customer has opted out of a convergent account invoicing process;

applying, when the customer has not selected the separate invoice, a convergent processing rule to determine whether the received first service contract data relates to an existing service contract, wherein the convergent processing rule has criteria defining that multiple service contracts are related based on payment data identifying a form of payment for an invoice; and generating an invoice reflecting the first service contract and the existing service contract based on a determination that the first service contract data relates to the existing service contract.

14. The method of claim 13, wherein the convergent processing rule includes criteria defining that multiple service contracts are related based on customer data identifying the customer.

\* \* \* \* \*